US012744748B1

(12) United States Patent
Styszynski et al.

(10) Patent No.: US 12,744,748 B1
(45) Date of Patent: Sep. 22, 2026

(54) LOGICAL TOP-OF-RACK (TOR) SWITCHES

(71) Applicant: Juniper Networks, Inc., Sunnyvale, CA (US)

(72) Inventors: Michal Styszynski, Antony (FR); Mahesh Kumar Subramaniam, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 434 days.

(21) Appl. No.: 18/491,565

(22) Filed: Oct. 20, 2023

(51) Int. Cl.
*H04L 49/25* (2022.01)
*H04L 49/00* (2022.01)
*H04L 49/90* (2022.01)

(52) U.S. Cl.
CPC ............ *H04L 49/70* (2013.01); *H04L 49/252* (2013.01); *H04L 49/9068* (2013.01)

(58) Field of Classification Search
CPC .... H04L 49/70; H04L 49/9068; H04L 49/252
See application file for complete search history.

(56) References Cited

U.S. PATENT DOCUMENTS 10,742,557 B1 8/2020 Miriyala et al.
11,165,598 B2 11/2021 Nagarajan et al.
11,575,541 B1 2/2023 Styszynski
12,309,061 B2 * 5/2025 Brar ........................ H04L 45/34
2018/0123975 A1 * 5/2018 Ayandeh ................. H04L 45/56
2021/0357242 A1 * 11/2021 Ballard ............... G06F 9/45558
2022/0417139 A1 * 12/2022 Brar ........................ H04L 45/34
2024/0056335 A1 * 2/2024 Brar ...................... H04L 49/354
2024/0411584 A1 * 12/2024 Brar ........................ H04L 49/25

FOREIGN PATENT DOCUMENTS

WO 2013184846 A1 12/2013

* cited by examiner

*Primary Examiner* — Kent Krueger
(74) *Attorney, Agent, or Firm* — Shumaker & Sieffert P.A.

(57) ABSTRACT

Techniques are disclosed for implementing logical Top-of-Rack (TOR) switches. In one example, a network device includes a plurality of interfaces. The interfaces may include physical and logical interfaces. The network device executes a plurality of network Operating System (OS) instances. In some examples, the network device executes each network OS instance within a corresponding Kubernetes pod. The network device allocates a different subset of the plurality of interfaces to each network OS instance. In some examples, the network device assigns a logical identifier, such as a color, to each subset of interfaces and corresponding network OS instance. Each network OS instance manages the forwarding of network traffic received via the respective subset of the plurality of interfaces allocated to the network OS instance.

20 Claims, 6 Drawing Sheets

500

Top Of Rack Ethernet 32 Port Switch
With multiple pod instances – example of 4X pods inside the same switch Promiscuous external ports P1 and P2 to communication between the PODs (when explicitly set)

The given promiscuous port P1/P2 can optimally be allocated also to a logical fabric-ID in the main OS

LOGICAL TOP-OF-RACK (TOR) SWITCHES

TECHNICAL FIELD

This disclosure generally relates to computer networks, and more specifically, to network devices such as Top-of-Rack switches.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

In general, the disclosure describes techniques for implementing logical Top-of-Rack (TOR) switches. In one example, a network device includes a plurality of interfaces. The interfaces may include physical and logical interfaces. The network device executes a plurality of network Operating System (OS) instances. In some examples, the network device executes each network OS instance within a corresponding Kubernetes pod. The network device allocates a different subset of the plurality of interfaces for management by each network OS instance. In some examples, the network device assigns a logical identifier, such as a color, to each subset of interfaces and corresponding network OS instance. Traffic received at an interface of one of the subsets of the plurality of interfaces is processed according to the network OS instance that has been allocated that subset, and in this way, a physical switch is effectively partitioned into multiple logical switches.

The techniques of the disclosure may provide specific improvements to the computer-related field of computer networking that have numerous practical applications. For example, using the techniques disclosed described herein, one may leverage the increased computational resources offered by today's network devices to virtualize the functionality of a TOR switch. Therefore, a TOR switch as described herein may provide logical isolation amongst different tenants of a data center, as well as enable more efficient load-balancing, utilization, and management of the resources of the bare-metal TOR switch (e.g., the physical, hardware-based computing resources of the TOR switch that underlay the logical TOR switches). In addition, the techniques of the disclosure may enable the deployment of tenants of the data center upon different line cards of a multi-line card chassis switching system, while providing, to each tenant, a virtualized environment that replicates a fully-dedicated TOR switch. In addition, the techniques of the disclosure may enable an operator of a switch fabric to allocate, to a virtual operator, a set of interfaces of a TOR switch for a predetermined amount of time, so as to enable the virtual operator to dynamically use the switching power of the TOR switch on-demand. Furthermore, the techniques of the disclosure may enable a single bare-metal TOR switch to support multiple data center tenants, each of whom desire to use a different network OS.

In one example, this disclosure describes a network device comprising: a plurality of interfaces; storage media; and processing circuitry in communication with the storage media, the processing circuitry configured to: execute a plurality of network OS instances; allocate a different subset of the plurality of interfaces to each network OS instance of the plurality of network OS instances; and manage, by each network OS instance of the plurality of network OS instances, the forwarding of network traffic received via the respective subset of the plurality of interfaces allocated to the network OS instance.

In another example, this disclosure describes a method comprising: executing, by a network device, a plurality of network OS instances; allocating, by the network device, a different subset of a plurality of interfaces of the network device to each network OS instance of the plurality of network OS instances; and managing, by each network OS instance of the plurality of network OS instances executed by the network device, the forwarding of network traffic received via the respective subset of the plurality of interfaces allocated to the network OS instance.

In another example, this disclosure describes non-transitory, computer-readable media comprising instructions that, when executed, are configured to cause processing circuitry of a network device to: execute a plurality of network OS instances; allocate a different subset of a plurality of interfaces of the network device to each network OS instance of the plurality of network OS instances; and manage, by each network OS instance of the plurality of network OS instances, the forwarding of network traffic received via the respective subset of the plurality of interfaces allocated to the network OS instance.

The details of one or more examples of the techniques of this disclosure are set forth in the accompanying drawings and the description below. Other features, objects, and advantages of the techniques will be apparent from the description and drawings.

BRIEF DESCRIPTION OF DRAWINGS

Like reference characters refer to like elements throughout the figures and description.

DETAILED DESCRIPTION

Figure 1:
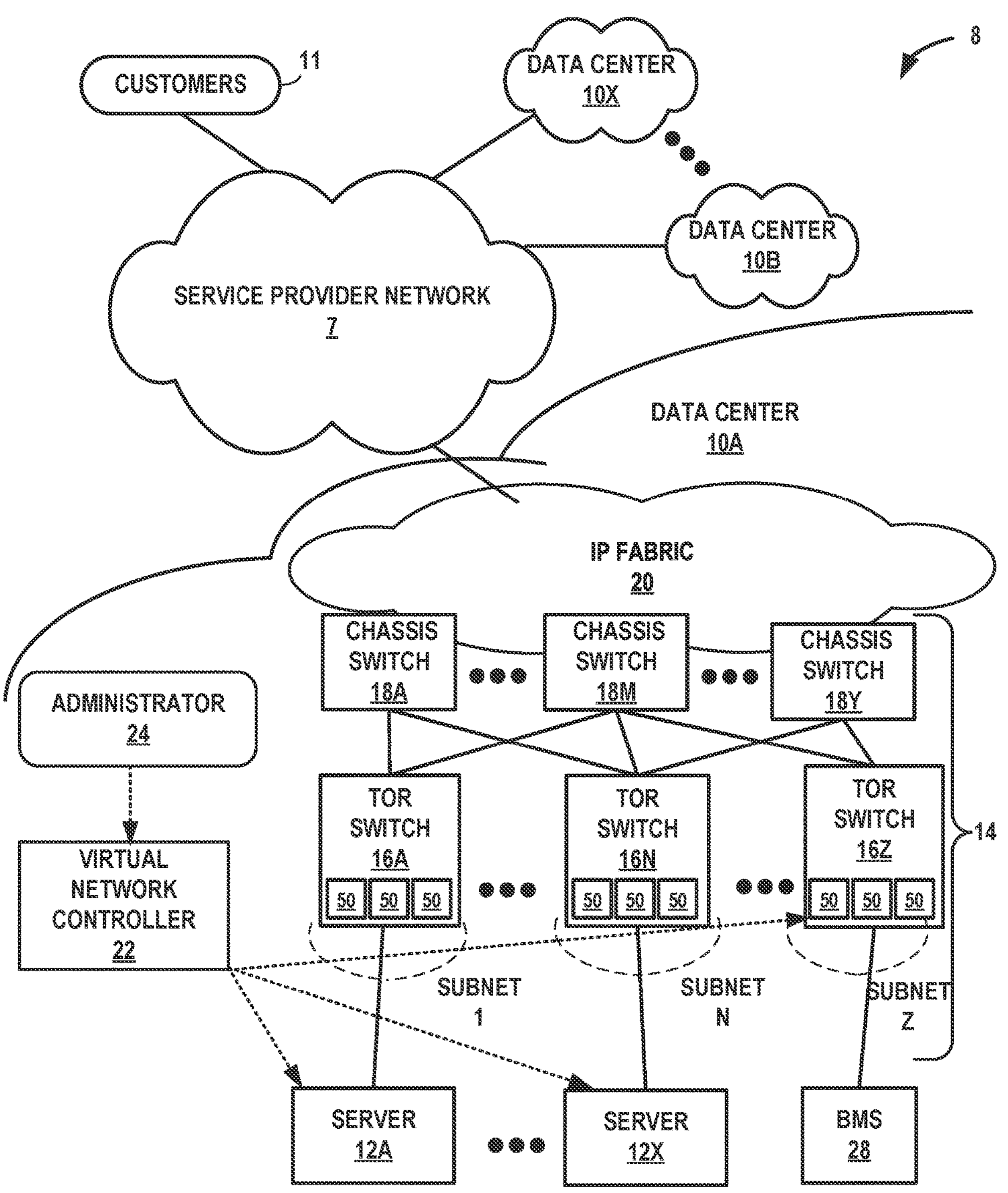
FIG. 1 is a block diagram illustrating an example network having a data center in which examples of the techniques described herein may be implemented.

Conventional Internet Protocol (IP) fabric network devices, such as TOR switches, typically execute a single instance of a network OS and allocate all of the physical interfaces of the network device to that instance. Alternatively, a conventional network device may offer a same OS instance with some level of logical partitioning within the OS. When the same physical fabric is offered to many telecommunications operators (for example, when multiple tenant operators are collocated within a same data center), a master operator may prefer to isolate the set of interfaces assigned to each sub-operator from each other sub-operator, as well as enable each sub-operator to manage their own physical fabric resources. Conventionally, datacenter network devices, such as switches, comprise of high-density ports implemented within a single physical switch that uses a common OS, routing process (e.g., Routing Protocol daemon (RPD)), and management daemon (MGD) for all traffic exchanged by all of the ports.

In accordance with the techniques of the disclosure, a physical network device, such as a TOR switch, implements a lightweight, containerized framework with which the physical network device may execute a plurality of logical TOR switches, each logical TOR switch implementing a different network OS instance. For example, a switch node executes a plurality of network OS instances, each network OS instance assigned to a different tenant of a data center. In addition, different subsets of the interfaces of the switch node are allocated to each network OS instance. In some examples, to assign subsets of interfaces to different network OS instances, each network OS instance is assigned a logical identifier. In some examples, the logical identifier comprises a color, e.g., "blue," "red," "green," "purple," "orange," etc. Furthermore, each interface of the plurality of interfaces of the switch is assigned the logical identifier corresponding to the network OS instance to which the interface is allocated. Each network OS instance may thereafter manage network traffic received via the interfaces allocated to the network OS instance, so as to apportion the physical TOR switch into multiple separate logical TOR switches.

In some examples, each logical TOR switch may be assigned a logical identifier that is the same as a logical identifier assigned to a logical fabric instance. In some examples, the logical identifier to which the logical TOR switch and/or logical fabric instance are assigned may signaled using Border Gateway Protocol (BGP) Deterministic Path Forwarding (DPF). Additional description with respect to the use of logical fabric instances and BGP-DPF is set forth in U.S. application Ser. No. 18/491,543, entitled "Logical Fabric Overlays," filed on Oct. 20, 2026, and which issued as U.S. Pat. No. 12,289,234 as Apr. 29, 2025, the entire content of which is incorporated herein by reference.

As non-limiting examples, in accordance with the techniques described herein, a network device may execute a different network OS instance per-logical TOR. Such network OS instances may include any combination of one or more network OS instances, such as one or more containerized network OSs, such as cSRX offered by Juniper, Inc., network OSs offered by third-party vendors, open-source network OSs such as Sonic OS, cRPD container instances, or other containerized network OSs. In some examples, the network OS instance running in each logical TOR uses containerized framework so as to allow a main operator to manage the logical TORs of a network device as part of a Kubernetes deployment infrastructure.

In some examples, a switch node is partitioned into multiple switching pods using the Kubernetes architecture, each pod running independent containers of routing and/or switching daemons. In some examples, a single pod is assigned to a tenant of a datacenter. In these examples, each pod comprises at least one container that executes a networking daemon in a containerized format that is capable of setting IP addresses and/or learning MAC addresses on the logical or physical interfaces allocated to the pod.

In some examples, the master pod allocates each interface to a tenant pod identifier. Once the interfaces are allocated, communication between interfaces of different pod is disabled by default, so as to provide full isolation between pods of different tenants at the data plane level. In some examples, to enable communication between pods of different tenants, an interface of each pod is selected as an external "promiscuous" interface. A pod within a physical switch may use a corresponding promiscuous interface (if and when allocated) to communicate with another pod within the same physical switch or one or more external ports managed by the main operator of the physical switch. In addition or in the alternative, a pod within a physical switch may use its allocated interfaces to communicate with other devices external to the physical switch.

In some examples, each pod includes a container that executes an independent lightweight routing and switching daemon. The routing and switching daemon may offer traditional network virtualization techniques, such as Internet Protocol Virtual Routing and Forwarding (IPVRF), Media Access Control Virtual Routing and Forwarding (MAC-VRF), and/or Ethernet Virtual Private Network (EVPN) Virtual extensible Local Area Network (LAN) (VXLAN) (EVPN-VXLAN). In some examples, each pod executes one or more additional containers, each of which may provide one or more additional network services, such as Network Address Translation (NAT), Internet Protocol Security (IPSec), Intrusion Prevention System (IPS), etc.

Therefore, a network device operating as described herein may provide a different logical TOR switch to each different tenant of a data center, thereby enabling service provider operators and/or colocation data center operators to share a same physical switch with multiple tenants, while providing isolated OS and RPDs for each tenants, as well as providing a fully separate switch context between different tenants. The logical TOR switch of the present disclosure may also be referred to herein as a "virtual TOR" switch, "Micro-TOR" switch, or "μ-TOR" switch.

Using the approach described herein, tenants running various workloads at colocation datacenters may benefit by having an isolated logical switch and efficient, determined resource utilization. In addition, the techniques disclosed herein may enable service provider operators and/or colocation data center operators to gain power efficiency by leveraging a single physical switch that may achieve the special requirements of multiple different tenants, such as different OS needs, dedicated port resources, and security needs. Furthermore, as described in more detail below, each logical TOR switch may implement a "promiscuous" virtual port (also referred to herein as a "P-port") that enables the logical TOR switches within a single physical network device to communicate with one another, when needed.

A network device, such as a TOR switch, that operates in accordance with the techniques of the disclosure may extend Bare Metal Server (BMS) cloud offerings. Besides the BMS, a given datacenter or service provider may also offer, to a tenant, a set of ports on the fabric that the tenant may be allowed to operate independently. In some examples, a network device may provide a micro-TOR as a service, and enable a tenant to install any certified network OS that possesses standard container capabilities for integration with Kubernetes.

With the approach described herein, a main operator can give a virtual operator a set of ports for a limited time and allow him or her to use the switching power of network device on-demand or as-needed. For example, a main operator may increase the number of ports allocated to a virtual operator during periods of high utilization by the virtual operator, and likewise decrease the number of ports allocated to the virtual operator during periods of low utilization by the virtual operator.

Modern network devices, which are more powerful than legacy network devices, may possess sufficient resources such that executing multiple logical TORs does not substantially impact the performance of the network device. For example, a network device that includes a CPU with at least 8 cores may implement the techniques of the disclosure without substantial impact.

FIG. 1 is a block diagram illustrating an example network system in which examples of the techniques described herein may be implemented. Network system 2 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may represent a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Switch fabric 14 is provided by a set of interconnected TOR switches 16A-16Z (collectively, "TOR switches 16") coupled to a distribution layer of chassis switches 18A-18M (collectively, "chassis switches 18"). Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7.

Virtual network controller 22 ("VNC") provides a logically and in some cases physically centralized controller for facilitating operation of one or more virtual networks within each of data centers 10, such as data center 10A, in accordance with one or more embodiments of this disclosure. In some examples, virtual network controller 22 may operate in response to configuration input received from network administrator 24. Additional information regarding virtual network controller 22 operating in conjunction with other devices of data center 10A or other software-defined network is found in International Application Number PCT/US2013/044378, filed Jun. 5, 2013, and entitled "PHYSICAL PATH DETERMINATION FOR VIRTUAL NETWORK PACKET FLOWS," which is incorporated by reference as if fully set forth herein.

In some examples, the traffic between any two network devices, such as between network devices within IP fabric 20 (not shown), between servers 12 and customers 11, or between servers 12, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection.

A set of one or more packet data units (PDUs) that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

As further shown in the example of FIG. 1, switch fabric 14 may include additional TOR switches 16O-16Z that interface with so-called bare metal servers ("BMS") 28. BMS 28 may represent a server dedicated for use by a single customer, which may also be called a "single-tenant server." Unlike servers 12 in which multiple customers (or, again, in other words, "tenants") may interact with the same physical hardware, i.e., server 12, to interface with their individually allocated virtual router, BMS 28 is dedicated for use only by a single customer.

BMS 28 may provide dedicated hardware for use by the single customer to avoid so-called "noisy neighbor problems" that occur in multi-tenant servers 12. That is, while each customer may receive a dedicated virtual router that generally is not impacted by operation of any other dedicated virtual routers by one of multi-tenant servers 12, in certain contexts, the other virtual routers may consume resources (e.g., processor cycles, memory, bandwidth, etc.) that would have otherwise been available for another customer's virtual routers, thereby degrading the performance of the remaining virtual routers (much as a noisy neighbor may create problems for other residents, hence the name "noisy neighbor problems"). As such, BMS 28 may provide a dedicate hardware environment that avoids such noisy neighbor problems, and thereby potentially ensures that the customer processing demands are more likely to be met. One premise driving the use of BMS 28 therefore lies in exclusivity, and as a result, some data center operators may not allow BMS 28 to execute the above noted VN agents responsible for enforcing the policies within BMS 28.

In accordance with the techniques described in this disclosure, each of TOR switches 16 implements one or more logical TOR switches 50. In one example, TOR switch 16A includes a plurality of interfaces (not depicted in FIG. 1). The interfaces may include one or more physical and/or logical interfaces. In some examples, each logical TOR switch 50 comprises a different network OS instance executed by the TOR switch 16. For example, each logical TOR switch 50 comprises a Kubernetes pod, each pod assigned to a different tenant of data center 10A. Each pod comprises at least one container which executes a network OS instance for the corresponding tenant. TOR switch 16A allocates a different subset of the plurality of interfaces to each network OS instance. In some examples, TOR switch 16A assigns a logical identifier, such as a color, to each subset of interfaces and corresponding network OS instance and/or pod. Each network OS instance of the plurality of network OS instances of TOR switch 16A manages the forwarding of network traffic received via the respective subset of the plurality of interfaces allocated to the network OS instance.

Figure 2:
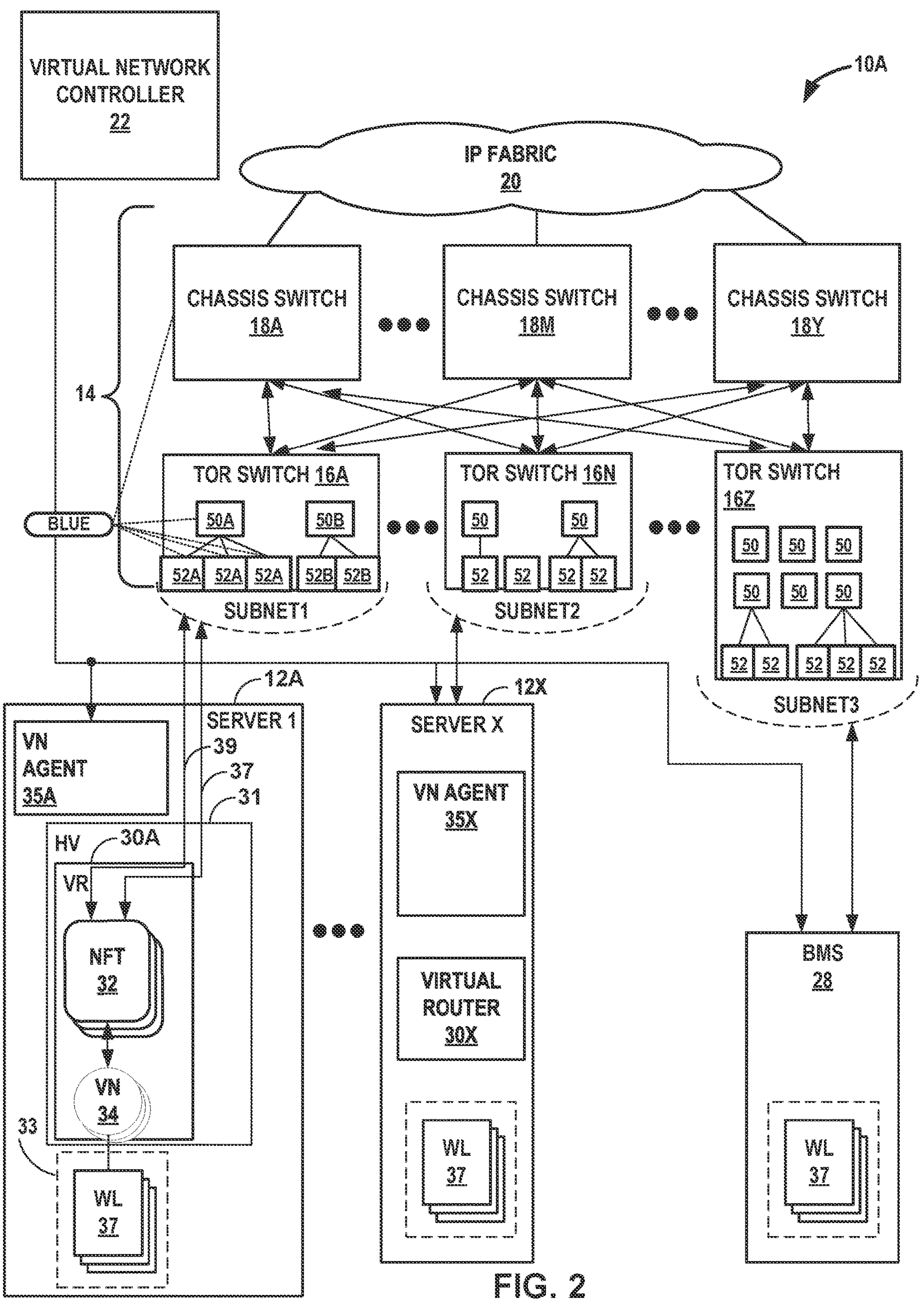
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, data center 10A includes an overlay network that extends switch fabric 14 from physical switches 16, 18 to software or "virtual" switches 30A-30X (collectively, "virtual routers 30" or "VR 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various processes may be used to transport packets within and across virtual networks 34 over the physical network. In some examples, virtual networks 34 may provide multicast service without requiring multicast support in the underlying physical network.

Each virtual router 30 may execute within a hypervisor, a host OS or other component of each of servers 12. Each of servers 12 may represent an x86 or other general-purpose server, or a special-purpose server, capable of executing workloads (WL) 37. In the example of FIG. 2, virtual router 30A executes within hypervisor 31, also often referred to as a virtual machine manager (VMM) and may be denoted as "HV" in the example of FIG. 2, which provides a virtualization platform that allows multiple OSs to concurrently execute within one of servers 12. In the example of FIG. 2, virtual router 30A manages virtual networks (VN) 34, each of which provides a network environment for execution of one or more virtual machines (VMs) (that may execute one or more of WLs 37) within the virtualization platform provided by hypervisor 31. Each VM is associated with one of the virtual networks and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of the VMs may represent containers, another form of virtualized execution environment. That is, both virtual machines and container are examples of virtualized execution environments for executing workloads.

In general, each WL 37 may be any type of software application and may be assigned a virtual address for use within a corresponding virtual network 34, where each of the virtual networks may be a different virtual subnet provided by virtual router 30A. A WL 37 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10A. VN agents 35 may operate as a proxy for control plane messages between WLs 37 and virtual network controller 22. For example, a WL 37 may request to send a message using its virtual address via the VN agent 35A, and VN agent 35A may in turn send the message and request that a response to the message be received for the virtual address of one of WLs 27 that originated the first message. In some cases, a WL 37 may invoke a procedure or function call presented by an application programming interface of VN agent 35A, and the VN agent 35A may handle encapsulation of the message, including addressing. Each VN agent 35 may also apply one or more policies to one or more categories, as described in more detail below.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host OS running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10A. Virtual network controller 22 may, for example, maintain a routing information base, e.g., one or more routing tables that store routing information for the physical network as well as one or more overlay networks of data center 10A. Switches 16, 18 and virtual routers 30 may also maintain routing information, such as one or more routing and/or forwarding tables. In one example, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with the techniques described in this disclosure, each of TOR switches 16 implements one or more logical TOR switches 50. In one example, Each TOR switch 16 includes a plurality of interfaces 52. Interfaces 52 may include one or more physical and/or logical interfaces. In some examples, each logical TOR switch 50 comprises a different network OS instance executed by the TOR switch 16. For example, each logical TOR switch 50 comprises a Kubernetes pod, each pod assigned to a different tenant of data center 10A. Each pod comprises at least one container which executes a network OS instance for the corresponding tenant. A TOR switch 16 allocates a different subset of the plurality of interfaces to each network OS instance. In some examples, each TOR switch 16 assigns a logical identifier, such as a color, to each subset of interfaces and corresponding network OS instance and/or pod. Each network OS instance of the plurality of network OS instances of a TOR switch manages the forwarding of network traffic received via the respective subset of the plurality of interfaces allocated to the network OS instance.

In some examples, one of TOR switches 16, for example, TOR switch 16A, includes a plurality of interfaces 52A and 52B. In this example, TOR switch 16A assigns a first subset of interfaces 52A to logical TOR switch 50A, which executes a first network OS instance. TOR switch 16A further assigns a second subset interfaces 52B to logical TOR switch 50B, which executes a second network OS instance. The first network OS instance of logical TOR switch 50A and the second network OS instance of logical TOR switch 50B may have the same network OS type and version, or may have different types or versions of network OSs. The first network OS instance of logical TOR switch 50A may forward network traffic received via the first subset of interfaces 52A to another network device, such as one of chassis switches 18 or servers 12, via one or more physical Ethernet interfaces of the first subset of interfaces 52A. In a similar fashion, the second network OS instance of logical TOR switch 50B may forward network traffic received via the second subset of interfaces 52B to another network device, such as one of chassis switches 18 or servers 12, via one or more physical Ethernet interfaces of the second subset of interfaces 52B.

In some examples, TOR switch 16A assigns, to the first network OS instance of logical TOR switch 50A, a logical identifier (e.g., "blue"). The TOR switch 16A assigns, to interfaces 52A, the same logical identifier (e.g., "blue") so as to allocate interfaces 52A to the first network OS instance of logical TOR switch 50A. In some examples, to forward network traffic associated with the "blue" logical identifier across switch fabric 14, the first network OS instance selects one of chassis switches 18 to which the same logical identifier has been assigned (e.g., "blue"), and forwards the network traffic to the selected one of chassis switches 18 to which the logical identifier has been assigned.

Figure 3:
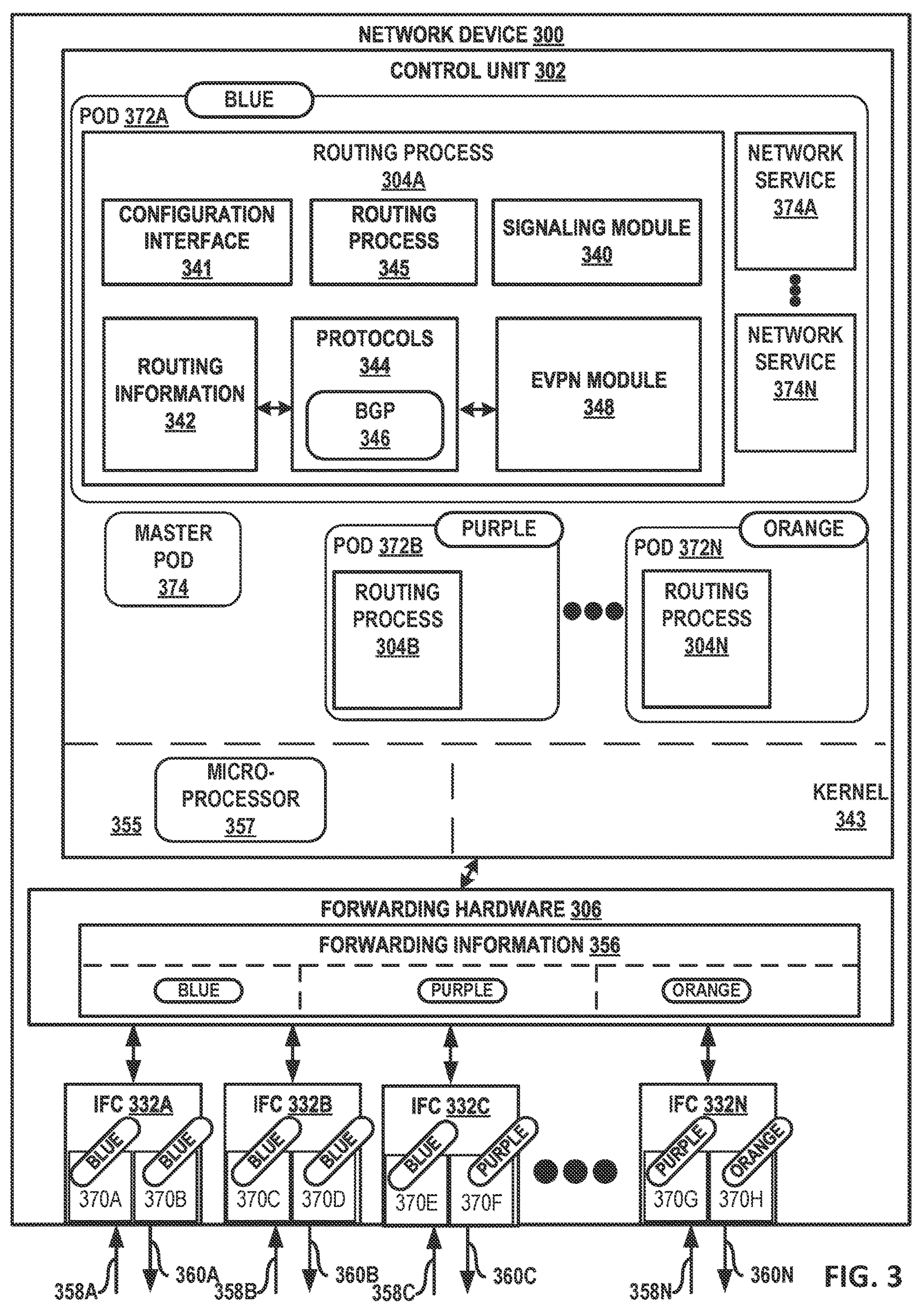
FIG. 3 is a block diagram illustrating an example network device in accordance with techniques described in this disclosure.

FIG. 3 is a block diagram illustrating an example network device 300 in accordance with the techniques of the disclosure. Network device 300 of FIG. 3 may be an example of one of chassis switches 18 or TOR switches 16 of FIGS. 1 and 2.

In this example, network device 300 comprises a chassis switching system that includes a control unit 302 coupled to forwarding hardware 306. Forwarding hardware 306 is associated with one or more of a plurality of interface cards 332A-332N ("IFCs 332") (also referred to herein as "line cards"). Each interface card includes a plurality of interfaces 370A-370N (collectively, "interfaces "370") that receive packets via inbound links 358A-358N ("inbound links 358") and send packets via outbound links 360A-360N ("outbound links 360"). Interfaces 370 for inbound links 358 and outbound links 360 may represent physical interfaces, logical interfaces, or some combination thereof. Interfaces 370 for links 358, 360 may represent local interfaces of network device 300.

Control unit 302 includes kernel 343, which provides a run-time operating environment for user-level processes. Kernel 343 may represent, for example, a UNIX OS derivative such as Linux or Berkeley Software Distribution (BSD). Kernel 343 offers libraries and drivers by which user-level processes may interact with the underlying system. Hardware environment 355 of control unit 302 includes microprocessor 357 that executes program instructions loaded into a main memory (not shown in FIG. 3) from a storage device (also not shown in FIG. 3) in order to execute the software stack, including both kernel 343 and processes executing on the operating environment provided by kernel 343. Microprocessor 357 may represent one or more general or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Elements of control unit 302 and forwarding hardware 306 may be implemented solely in software, or hardware, or may be implemented as combinations of software, hardware, or firmware. For example, control unit 302 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 302 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 300, e.g., protocols. Control unit 302, in some examples, retrieves and executes the instructions from memory for these aspects.

In the example of FIG. 3, network device 300 deploys a plurality of Kubernetes pods, including master pod 374 and a plurality of worker pods 372A-372N (hereinafter, "pods 372" or "worker pods 372"). Master pod 374 provides a control plane with which an administrator may perform administrative and control functions for the Kubernetes architecture. Each of pods 372 may instantiate one or more containers for executing user applications and workloads. Each of pods 372 provides logical isolation from each other pod such that the containers executing within a first pod 372 may intercommunicate, but are logically isolated from the containers executing within a second pod 372.

While the example of FIG. 3 uses a Kubernetes deployment, other types of deployments may use the techniques of the disclosure. For example, the techniques of the disclosure may be implemented using another hypervisor-based architecture or container-based architecture.

In accordance with the techniques of the disclosure, control unit 302 deploys a plurality of pods 372, each of which may operate as one of logical TOR switches 50 of FIGS. 1 and 2. In some examples, each pod 372 instantiates a container which executes a logically-isolated network OS instance. Each pod 372 may be assigned to a different tenant of data center 10A of FIG. 1. In addition, control unit 302 allocates a different subset of interfaces 370 to each pod 372. In some examples, control unit 302 may assign each of the interfaces 370 of a single IFC 332 to a single pod 372. In other examples, control unit 302 may assign a first portion of the interfaces 370 of a single IFC 332 to a first pod 372 and a second portion of the interfaces 370 of the IFC 332 to a second pod 372. Additionally, control unit 302 may assign interfaces 370 from one IFC 332 or multiple IFCs 332, in part or in whole, to a pod 372, as needed to satisfy the network and operational requirements of the network OS instance.

In some examples, to assign interfaces 370 to a network OS instance, control unit 302 assigns a logical identifier to each pod 372 as well as to each subset of interfaces 370 allocated to the respective pod 372. In some examples, the logical identifier may be a color, a number, an identifier for a corresponding tenant, or a descriptive textual item. As described in more detail below, each network OS instance of a respective pod 372 manages the forwarding of network traffic received via the respective interfaces 370 that share the same logical identifier allocated to the network OS instance and/or respective pod 372 executing the network OS instance.

Typically, each network OS instance manages the forwarding of network traffic received via only the respective subset of interfaces 370 allocated to the corresponding pod 372 executing the network OS instance, and not via other interfaces 370 not allocated to the corresponding pod 372 executing the network OS instance, thereby providing logical isolation between pods 372 (and network OS instances).

Pods 372 may typically be configured to be unable to communicate with one another. However, in some examples, control unit 302 allocates at least one logical interface 370 to each pod 372 to enable communication amongst the pods 372 of network device 300. For example, control unit 302 allocates a first logical interface to pod 372A and a second logical interface to pod 372. Pod 372A may use the first logical interface and pod 372B may use the second logical interface to exchange network traffic between one another.

As depicted in the example of FIG. 3, pod 372A instantiates a first container, which executes routing process 304A. In a similar fashion, pod 372B instantiates a second container, which executes routing process 304B, and pod 372N instantiates an Nth container, which executes routing process 304N. Routing processes 304A-304N (collectively, "routing processes 304") may be examples of instances of network OSs. In other examples, a network OS may be a Unix- or Linux-derivative OS, or even a lightweight routing process. Therefore, each pod 372 may execute independent instances of network OSs within network device 300. The techniques of the disclosure may enable network device 300, in some examples, to execute multiple instances of a same version of a network OS; multiple instances of different versions of the network OS; or multiple instances of different network OSs, each of which may be isolated from one another and manage the forwarding of network traffic received in interfaces assigned to the respective network OS instance.

In some examples, pod 372A instantiates additional containers, each of which may execute one or more network services 374A-374N (collectively, "network services 374"). For example, network services 374 may include services such as NAT, IPSec, IPS, etc., each of which may be executed within its own respective container.

Routing process 304A includes a routing process 345 that executes various protocols 344 at different layers of a network stack, including protocols for implementing Ethernet Virtual Private Networks. For example, routing process 304 includes network protocols 344 that operate at a network layer of the network stack. In the example of FIG. 3, network protocols 344 include Border Gateway Protocol (BGP) 346, which is a routing protocol. Routing process 304A may also include other protocols, such as an MPLS label distribution protocol and/or other MPLS protocols not shown in FIG. 3. Routing process 304A is responsible for the maintenance of routing information 342 to reflect the current topology of a network and other network entities to which network device 300 is connected. In particular, routing protocols 344 periodically update routing information 342 to accurately reflect the topology of the network and other entities based on routing protocol messages received by network device 300.

Routing information 342 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF).

Routing process 304A also includes an EVPN module 348 that performs L2 learning using BGP 346. EVPN module 348 may maintain tables for each EVPN instance (EVI) established by network device 300, or in alternative examples, may maintain one or more tables that are independent of each respective EVI. In some examples, network device 300 may use EVPN module 348 to advertise, e.g., EVPN routes. Routing process 345A may use EVPN module 348 to generate EVPN routes and send and receive, via BGP 346 sessions with other network devices, the EVPN routes.

Signaling module 340 outputs control plane messages to automatically establish tunnels to interconnect multiple network devices including network device 300 and otherwise provision one or more EVIs configured for network device 300 and other network devices. Signaling module 340 may signal the network devices using one or more suitable tunnel signaling protocols, such as GRE, VXLAN, and/or MPLS protocols. Signaling module 340 can communicate with forwarding hardware 306 to automatically update forwarding information 356. In some examples, signaling module 340 may be part of or executed by routing process 345.

Routing process 304A also includes a configuration interface 341 that receives and may report configuration data for network device 300. Configuration interface 341 may represent a command line interface; a graphical user interface; Simple Network Management Protocol (SNMP), Netconf, or another configuration protocol; or some combination of the above in some examples. Configuration interface 341 receives configuration data configuring the network device 300, and other constructs that at least partially define the operations of network device 300, including the techniques described herein.

Forwarding hardware 306 represents hardware and logic functions that provide high-speed forwarding of network traffic. Forwarding hardware 306 typically includes a set of one or more forwarding chips programmed with forwarding information 356 that maps network destinations with specific next hops and the corresponding output interface ports. In general, when network device 300 receives a packet via one of inbound links 358, forwarding hardware 306 identifies an associated next hop for the data packet by traversing the programmed forwarding information 356 based on information within the packet. Forwarding hardware 306 forwards the packet on one of outbound links 360 mapped to the corresponding next hop.

In the example of FIG. 3, forwarding hardware 306 includes forwarding information 356. In accordance with routing information 342, forwarding hardware 306 stores forwarding information 356 that maps packet field values to network destinations with specific next hops and corresponding outbound interface ports. For example, routing process 304A analyzes routing information 342 and generates forwarding information 356 in accordance with routing information 342. Forwarding information 356 may be maintained in the form of one or more tables, link lists, radix trees, databases, flat files, or any other data structures.

In accordance with the techniques of the disclosure, forwarding information 356 is apportioned by logical identifier. In this fashion, forwarding hardware 306 may use a different set of forwarding information 356 for each logical identifier assigned to a set of interfaces 370. Typically, a network OS instance associated with a particular logical identifier (e.g., "blue") generates a portion of forwarding information 356 that is associated with the same logical identifier (e.g., "blue"). When network traffic is received on an interface 370 assigned with the same logical identifier (e.g., "blue"), this portion of forwarding information 356 is used to map network destinations with specific next hops and corresponding output interface ports. For example, forwarding information 356 may map, for a first logical identifier "blue," first network destinations with specific next hops and corresponding output interface ports allocated to the first logical identifier "blue." Further, forwarding information 356 may map, for a second logical identifier "purple," first network destinations with specific next hops and corresponding output interface ports allocated to the first logical identifier "purple," etc. In this fashion, forwarding information 356 may be specific to each logical identifier (and therefore, to each logical TOR switch), and additionally, network traffic received by different logical TOR switches may receive different processing, forwarding, or treatment.

Forwarding hardware 306 stores forwarding information 356 for each EVI established by network device 300 to associate network destinations with specific next hops and the corresponding interface ports. Forwarding hardware 306 forwards the data packet on one of outbound links 360 to the corresponding next hop in accordance with forwarding information 356. At this time, forwarding hardware 306 may push and/or pop labels from the packet to forward the packet along a correct label switched path.

Figure 4:
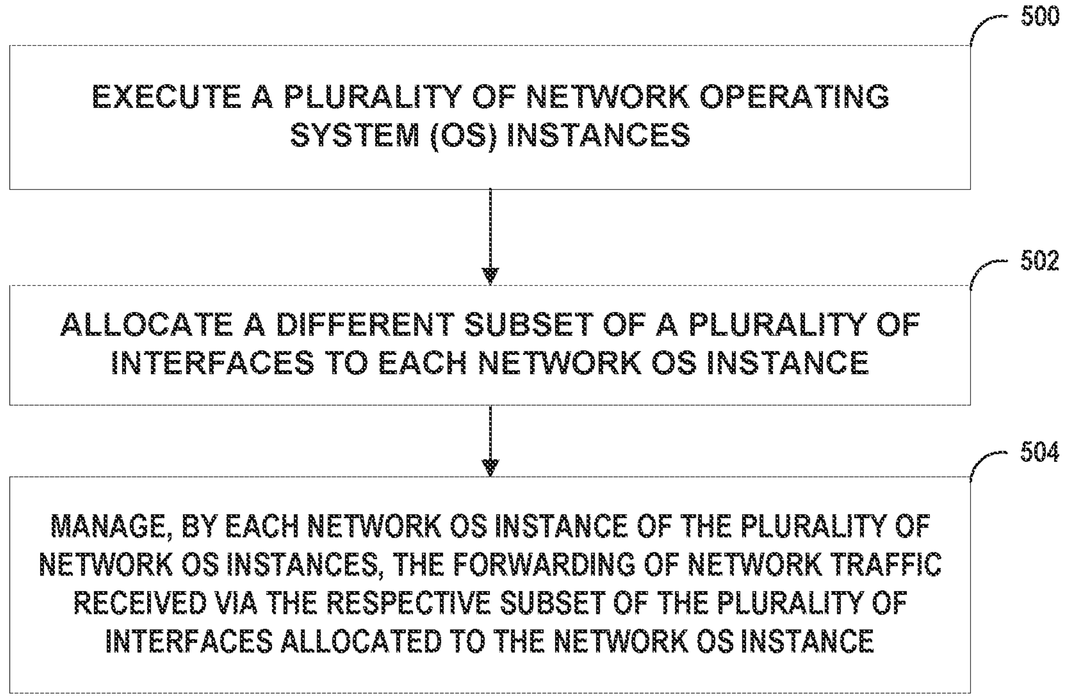
FIG. 4 is a flowchart illustrating an example operation in accordance with various aspects of the techniques described in the disclosure.

FIG. 4 is a flowchart illustrating an example operation in accordance with various aspects of the techniques described in the disclosure. The operation of FIG. 4 is described with respect to TOR switches 16 of FIGS. 1 and 2 for convenience only. In addition, the techniques of the disclosure may be implemented with network device 300 of FIG. 3, network device 500 of FIG. 5, or network devices 500A, 500B of FIG. 6.

As described above with respect to FIGS. 1 and 2, TOR switch 16A includes a plurality of interfaces 52. Interfaces 52 may include one or more physical and/or logical interfaces. TOR switch 16A executes a plurality of network OS instances hosted by a plurality of logical TOR switches 50 (502). For example, each logical TOR switch 50 comprises a Kubernetes worker pod, each worker pod assigned to a different tenant of data center 10A of FIG. 1. Each pod comprises at least one container which executes a network OS instance for the corresponding tenant.

TOR switch 16A allocates a different subset of the plurality of interfaces to each network OS instance of the plurality of network OS instances (504). For example, TOR switch 16A allocates a first subset comprising interfaces 52A to logical TOR switch 50A hosting a first network OS instance. TOR switch 16A further allocates a second subset comprising interfaces 52B to logical TOR switch 50B hosting a second network OS instance. In some examples, TOR switch 16A assigns a logical identifier, such as a color, to each subset of interfaces and corresponding network OS instance and/or pod. Each network OS instance of the plurality of network OS instances of TOR switch 16A manages the forwarding of network traffic received via the respective subset of the plurality of interfaces 52 allocated to the network OS instance hosted by the corresponding logical TOR switch 50 (506).

Figure 5:
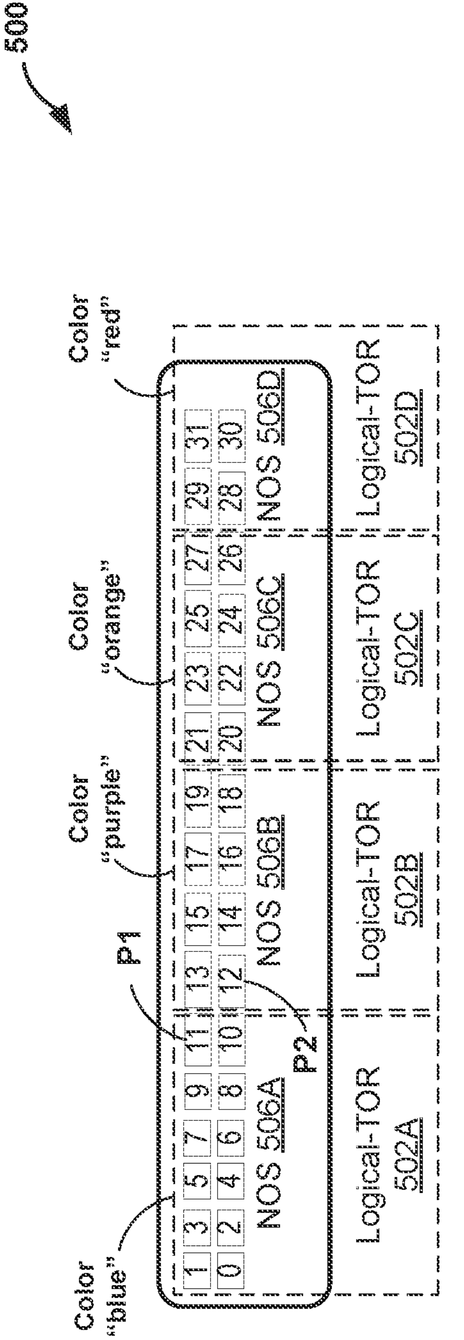
FIG. 5 is a block diagram illustrating an example network device in accordance with techniques described in this disclosure.

FIG. 5 is a block diagram illustrating an example network device 500 in accordance with techniques described in this disclosure. In some examples, network device 500 is an example of TOR switches 16 of FIG. 1, TOR switches 16 of FIG. 2, or network device 300 of FIG. 3.

As depicted in the example of FIG. 5, network device 500 implements multiple logical TOR switches 502A-502D (collectively, "logical TOR switches 502"). Each logical TOR switch 502 instantiates its own network OS instance 506A-506D (collectively, "network OS instance 506") such that network device 500 implements multiple, independent network OS instances 506 (e.g., one per logical TOR switch 502). Each logical TOR switch 502 (and corresponding network OS instance 506) may be assigned to a different tenant of the data center. As depicted in the example of FIG. 5, each logical TOR switch 502 is associated with a different logical identifier (e.g., the "color" depicted in FIG. 5).

When it comes to the communication between logical TOR switches 502, each logical TOR switch 502 uses a promiscuous port (e.g., "P1" and "P2" of FIG. 5). The promiscuous port is a virtual port (or "logical port") offering communication with main uplinks towards spine devices. This may simplify the way a given logical TOR switch 502 connects to the rest of the switch fabric.

In the example of FIG. 5, Ethernet Interfaces 0 to 11 are allocated to logical TOR switch 502A, interfaces 12 to 19 to logical TOR switch 502B, interfaces 20 to 27 to logical TOR switch 502C, and 28 to 31 to logical TOR switch 502D. Each logical TOR switch 502 is running an independent container executing a separate instance of a network OS.

In the example of FIG. 5, the last port of each logical TOR switch 502 offers an option to be provisioned as a revenue port and as a promiscuous port to communicate with the other logical TOR switches 502 or connect with the other logical TOR switches 502 enabled at different physical switches (e.g., other TOR switches 16 of FIG. 1). The same principle of port application to logical TOR switches 502 applies to the chassis-based switches 16 of FIG. 1 where, for example, each line card of the chassis switches 16 is allocated to a different virtual operator and completely isolated from the rest of the interfaces at other line cards. This way, a virtual operator perceives, from the primary infrastructure operator, that their environment runs upon a fully dedicated 36- or 48-port physical TOR switch while connected as a line card inside an 8- or 16-slot chassis switching system.

Figure 6:
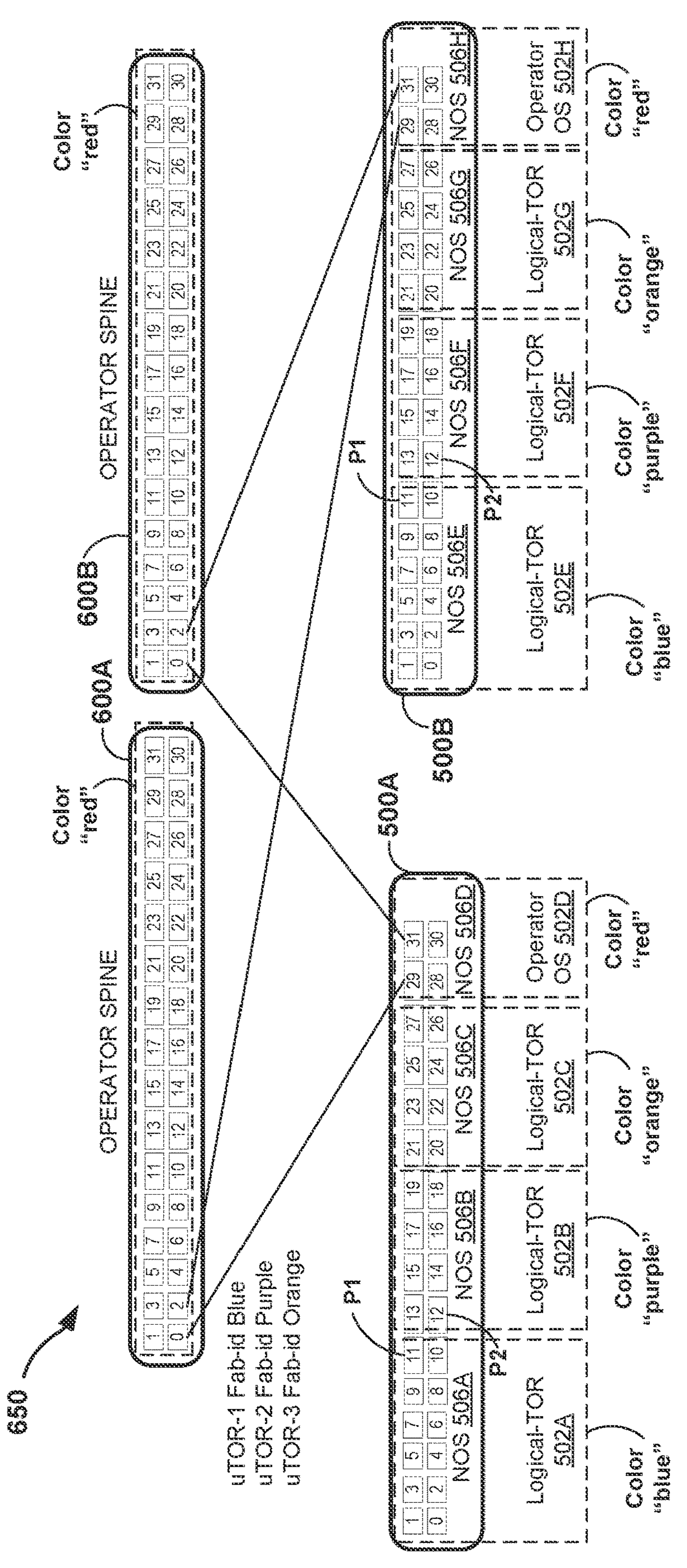
FIG. 6 is a block diagram illustrating a portion of an example switch fabric including network devices in accordance with techniques described in this disclosure.

FIG. 6 is a block diagram illustrating a portion of an example switch fabric 650 including network devices 500A, 500B, 600A, and 600B in accordance with techniques described in this disclosure. More specifically, FIG. 6 depicts an example integrating one or more logical TOR switches 502A-502G (collectively, "logical TOR switches 502") provided by network devices 500A, 500B with the rest of a data center fabric, in accordance with techniques described in this disclosure.

Network devices 500A, 500B may be examples of network device 500 of FIG. 5. Each logical TOR switch 502 of network devices 500A, 500B may execute a corresponding network OS instance 506A-506H (collectively, "network OS instances 506"). As depicted in the example of FIG. 6, each logical TOR switch 502 is associated with a different logical identifier (e.g., the "color" depicted in FIG. 6).

When there is a requirement to extend a logical TOR switch 502 on different fabric TOR switches 500A, 500B, the traffic from the given logical TOR switch 502, once it reaches the operator instance, is mapped to a different logical fabric identifier. Each logical fabric identifier is associated with a different color. In this fashion, the main fabric operator can isolate the network traffic associated with a particular logical TOR switch 502 to shared uplink resources. This can be achieved by signaling IP prefixes associated with the corresponding logical TOR switch 502 via BGP-DPF, as discussed in U.S. application Ser. No. 18/491,543, incorporated by reference above.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A network device comprising:

a plurality of interfaces;

processing circuitry; and storage media comprising instructions executable by the processing circuitry to cause the network device to:

execute a master pod comprising one or more containers and a plurality of worker pods comprising one or more containers, wherein each of the plurality of worker pods is configured to execute a corresponding network Operating System (OS) instance of a plurality of network OS instances, wherein the master pod is configured to assign each of the plurality of worker pods to a different, corresponding tenant of a plurality of tenants of a data-center, wherein the master pod is configured to allocate a different subset of the plurality of interfaces to each worker pod of the plurality of worker pods, and wherein each network OS instance of the plurality of network OS instances is configured to manage forwarding of network traffic associated with the corresponding tenant and received via the corresponding subset of the plurality of interfaces allocated to the worker pod of the plurality of worker pods that is configured to execute the network OS instance.

2. The network device of claim 1, wherein the master pod is configured to allocate a first subset of the plurality of interfaces to a first worker pod of the plurality of worker pods, the first worker pod configured to execute a first network OS instance of the plurality of network OS instances, the first subset comprising one or more physical Ethernet interfaces, and wherein the first network OS instance is configured to forward network traffic received via the first subset to a second network device via the one or more physical Ethernet interfaces of the first subset.

3. The network device of claim 1, wherein the master pod is configured to allocate a first subset of the plurality of interfaces to a first worker pod of the plurality of worker pods, the first worker pod configured to execute a first network OS instance of the plurality of network OS instances, the first subset comprising one or more first logical interfaces, wherein the master pod is configured to allocate a second subset of the plurality of interfaces to a second worker pod of the plurality of worker pods, the second worker pod configured to execute a second network OS instance of the plurality of network OS instances, the second subset comprising one or more second logical interfaces, and wherein the first network OS instance is configured to forward network traffic received via the first subset to the second network OS instance via the one or more first logical interfaces of the first subset and the one or more second logical interfaces of the second subset.

4. The network device of claim 1, wherein the processing circuitry is further configured to assign, to a first network OS instance of the plurality of network OS instances, a logical identifier (ID), and wherein the processing circuitry is further configured to:

select, based at least in part on a first switch fabric of a plurality of switch fabrics being assigned a logical ID that is the same as the logical ID assigned to the first network OS instance, the first switch fabric for forwarding network traffic of the first network OS instance; and forward, to the first switch fabric, the network traffic for the first network OS instance.

5. The network device of claim 4, wherein the logical ID comprises a color.

6. The network device of claim 1, wherein each network OS instance of the plurality of network OS instances is configured to manage the forwarding of network traffic received via only the respective subset of the plurality of interfaces allocated to the network OS instance and not via other interfaces of the plurality of interfaces.

7. The network device of claim 1, wherein the plurality of network OS instances comprise one or more of:

multiple instances of a same version of a network OS;

multiple instances of different versions of the network OS; or multiple instances of different network OSs.

8. The network device of claim 1, wherein the network device comprises a Top of Rack (TOR) switch.

9. The network device of claim 1, wherein the network device comprises a chassis switching system comprising a plurality of line cards, and wherein each of the plurality of line cards comprises a different one of the subsets of the plurality of interfaces.

10. A method comprising:

executing, by a network device, a master pod comprising one or more containers and a plurality of worker pods comprising one or more containers, wherein each of the plurality of worker pods is configured to execute a corresponding a plurality of network Operating System (OS) instance of a plurality of network OS instances;

assigning, by the master pod, each of the plurality of worker pods to a different, corresponding tenant of a plurality of tenants of a datacenter;

allocating, by the master pod, a different subset of a plurality of interfaces of the network device to each worker pod of the plurality of worker pods; and managing, by each network OS instance of the plurality of network OS instances executed by the network device, forwarding of network traffic associated with the corresponding tenant and received via the corresponding subset of the plurality of interfaces allocated to the worker pod of the plurality of worker pods that is configured to execute the network OS instance.

11. The method of claim 10, wherein allocating a different subset of the plurality of interfaces of the network device to each worker pod of the plurality of worker pods comprises allocating a first subset of the plurality of interfaces to a first worker pod of the plurality of worker pods, the first worker pod configured to execute a first network OS instance of the plurality of network OS instances, the first subset comprising one or more physical Ethernet interfaces, and wherein managing the forwarding of network traffic comprises forwarding, by the first network OS instance, network traffic received via the first subset to a second network device via the one or more physical Ethernet interfaces of the first subset.

12. The method of claim 10, wherein allocating a different subset of the plurality of interfaces of the network device to each worker pod of the plurality of worker pods comprises:

allocating a first subset of the plurality of interfaces to a first worker pod of the plurality of worker pods, the first worker pod configured to execute a first network OS instance of the plurality of network OS instances, the first subset comprising one or more first logical interfaces and allocating a second subset of the plurality of interfaces to a second worker pod of the plurality of worker pods, the second worker pod configured to execute a second network OS instance of the plurality of network OS instances, the second subset comprising one or more second logical interfaces, and wherein managing the forwarding of network traffic comprises forwarding, by the first network OS instance network traffic received via the first subset to the second network OS instance via the one or more first logical interfaces of the first subset and the one or more second logical interfaces of the second subset.

13. The method of claim 10, wherein the method further comprises assigning, by the network device and to a first network OS instance of the plurality of network OS instances, a logical identifier (ID), and wherein, exchanging the network traffic comprises:

selecting, based at least in part on a first switch fabric of a plurality of switch fabrics being assigned a logical ID that is the same as the logical ID assigned to the first network OS instance, the first switch fabric for forwarding network traffic of the first network OS instance; and forwarding, to the first switch fabric, the network traffic for the first network OS instance.

14. The method of claim 13, wherein the logical ID comprises a color.

15. The method of claim 10, wherein managing the forwarding of network traffic comprises managing, by each network OS instance of the plurality of network OS instances, the forwarding of network traffic received via only the respective subset of the plurality of interfaces allocated to the network OS instance and not via other interfaces of the plurality of interfaces.

16. The method of claim 10, wherein the plurality of network OS instances comprise one or more of:

multiple instances of a same version of a network OS;

multiple instances of different versions of the network OS; or multiple instances of different network OSs.

17. The method of claim 10, wherein the network device comprises a Top of Rack (TOR) switch.

18. Non-transitory, computer-readable media comprising instructions executable to cause processing circuitry of a network device to:

execute a master pod comprising one or more containers and a plurality of worker pods comprising one or more containers, wherein each of the plurality of worker pods is configured to execute a corresponding network Operating System (OS) instance of a plurality of network OS instances, wherein the master pod is configured to assign each of the plurality of worker pods to a different, corresponding tenant of a plurality of tenants of a datacenter, wherein the master pod is configured to allocate a different subset of the plurality of interfaces to each worker pod of the plurality of worker pods, and wherein each network OS instance of the plurality of network OS instances is configured to manage forwarding of network traffic associated with the corresponding tenant and received via the corresponding subset of the plurality of interfaces allocated to the worker pod of the plurality of worker pods that is configured to execute the network OS instance.

19. The non-transitory, computer-readable media of claim 18, wherein the master pod is configured to allocate a first subset of the plurality of interfaces to a first worker pod of the plurality of worker pods, the first worker pod configured to execute a first network OS instance of the plurality of network OS instances, the first subset comprising one or more physical Ethernet interfaces, and wherein the first network OS instance is configured to forward network traffic received via the first subset to a second network device via the one or more physical Ethernet interfaces of the first subset.

20. The non-transitory, computer-readable media of claim 18, wherein the master pod is configured to allocate a first subset of the plurality of interfaces to a first worker pod of the plurality of worker pods, the first worker pod configured to execute a first network OS instance of the plurality of network OS instances, the first subset comprising one or more first logical interfaces, wherein the master pod is configured to allocate a second subset of the plurality of interfaces to a second worker pod of the plurality of worker pods, the second worker pod configured to execute a second network OS instance of the plurality of network OS instances, the second subset comprising one or more second logical interfaces, and wherein the first network OS instance is configured to forward network traffic received via the first subset to the second network OS instance via the one or more first logical interfaces of the first subset and the one or more second logical interfaces of the second subset.

* * * * *